United States Patent
Raman et al.

(10) Patent No.: US 7,606,313 B2
(45) Date of Patent: Oct. 20, 2009

(54) SYSTEM, METHOD, AND APPARATUS FOR ERROR CONCEALMENT IN CODED VIDEO SIGNALS

(75) Inventors: Arvind Raman, Bangalore (IN); Murali Babu Muthukrishnan, Bangalore (IN)

(73) Assignee: Ittiam Systems (P) Ltd., Bangalore, Karnataka (IN)

( * ) Notice: Subject to any disclaimer, the term of this patent is extended or adjusted under 35 U.S.C. 154(b) by 202 days.

(21) Appl. No.: 10/758,689

(22) Filed: Jan. 15, 2004

(65) Prior Publication Data

US 2005/0157799 A1    Jul. 21, 2005

(51) Int. Cl.
*H04N 7/18* (2006.01)
(52) U.S. Cl. .............................. 375/240.27; 375/240.26
(58) Field of Classification Search ................. 375/240.01–240.29
See application file for complete search history.

(56) References Cited

U.S. PATENT DOCUMENTS

| 5,566,089 A | * | 10/1996 | Hoogenboom | 358/1.15 |
| 5,621,467 A | * | 4/1997 | Chien et al. | 375/240.15 |
| 6,876,705 B2 | * | 4/2005 | Katsavounidis et al. | 375/240.28 |

* cited by examiner

*Primary Examiner*—Andy S Rao
(74) *Attorney, Agent, or Firm*—Prakash Nama; Global IP Services, PLLC (57) ABSTRACT

Efficient techniques are provided to detect and correct channel errors found in an encoded video signal. In one example embodiment, header information in a video frame is analyzed to detect channel errors in the video frame. The video frame is then corrected for detected channel errors by isolating the detected channel errors to a few macroblocks in the video frame to reduce data loss and improve video quality.

22 Claims, 6 Drawing Sheets

SYSTEM, METHOD, AND APPARATUS FOR ERROR CONCEALMENT IN CODED VIDEO SIGNALS

TECHNICAL FIELD OF THE INVENTION

The present invention relates generally to digital video signal processing and more particularly to error detection, recovery, and concealment within a Moving Picture Experts Group (MPEG) decoder system.

BACKGROUND OF THE INVENTION

Transmission of digitized video signals can provide video images of a much higher quality than the transmission of analog signals. However, the available frequency bandwidth of a conventional transmission channel is limited. In order to reduce bandwidth requirement and the amount of data to be sent during transmission, the voluminous digital video signal is compressed via encoding, without a considerable loss in visual quality.

Digital video encoding has achieved tremendous progress over the last decade. Various algorithms have been developed to achieve a very good quality video encoding at a given bandwidth using a combination of block transforms and inter frame motion estimation. These algorithms developed by the ISO MPEG committee (www.mpeg.org), namely MPEG-1 (ISO/IEC 11172-2), MPEG-2 (ISO/IEC13818-2), and MPEG-4 (ISO/IEC 14496-2) standards have become very popular over the years and have had greater acceptability because of the standardization in the encoding and the decoding methods.

MPEG-4 video compression removes spatial redundancy by employing discrete cosine transformation (or wavelet transform), quantization, zigzag scanning, and variable-length coding. Temporal redundancy is also removed through a process of inter-frame motion estimation and predictive coding. The entire frame to be coded is divided into squares of 8×8 blocks and/or 16×16 macroblocks. The MPEG-4 coded frames may be either intra-coded, forward only predictive coded, or bidirectional-predictive coded. An intra-coded frame is coded using only the spatial compression techniques, while a forward only predicted frame is coded using macroblocks selected from a single reference frame. A given bidirectional-predictive frame is encoded using macroblocks generated by interpolating between a pair of macroblocks selected from two reference frames, one preceding and the other following the bidirectional-predictive frame.

A significant problem with compressing video signals for transmission over limited bandwidth transmission paths is that the data becomes more susceptible to the presence of transmission errors. The nature of the transmission path will be such that the channel errors usually cannot be prevented, which can lead to undesirable quality degradation. Since MPEG uses predictive coding of frames, the quality degradation due to channel errors can propagate from one frame to another. In order to avoid these undesirable video quality degradation, channel error recovery and correction is generally applied to the decoded video.

One conventional method for detecting channel errors comprises including error correction codes as an overhead in the transmitted signal. Such methods prohibit using standard encoders and decoders. Other conventional techniques to detect channel errors have primitive error recovery techniques where the decoding process is re-synchronized to start a predetermined resynchronization point and the entire video packet that was in error is assumed to be damaged. These resynchronization points may be several macroblocks apart and the entire set of macroblocks lying between the two synchronization points is discarded to avoid any quality degradation. In addition, this can have an undesirable effect on the next frame due to the predictive coding applied as stated above. Hence the next frame, which uses the previous damaged frame's macroblocks, can also have severe quality degradation despite the frame being received without errors. This can result in excessive data loss, leading to unacceptable video quality, especially when a bit error rate is high.

Most conventional error recovery and correction techniques use the idea of unequal error protection, wherein portions of the video stream are protected with error correcting codes. The disadvantage with such schemes is that they are intrusive and require a change in the hardware at the encoding end. In addition, some conventional techniques use complex error correction techniques and are generally not suitable for real-time applications and are usually very expensive to implement in real-time embedded systems. Further, the conventional systems lack efficient and robust error localization and concealment techniques. Furthermore, conventional systems do not take advantage of error isolation toolsets like resynchronization markers, data partitioning, reversible variable length codes, and so on provided in MPEG-4 to isolate errors in the video packets to a few damaged blocks to achieve superior error localization, recovery, and concealment. Therefore, the conventional systems are generally inadequate to correct visual artifacts produced due to channel errors in coded video streams.

SUMMARY OF THE INVENTION

The present invention provides error detection and recovery techniques for channel errors, encountered during transmission, found at a decoder end while decoding compressed video signals. In one example embodiment, this is accomplished by analyzing header information in a coded video frame to detect for any channel errors found in the received coded video signal. Then the coded video frame is corrected for the channel errors by isolating the found channel errors to a few macroblocks in the video frame.

DETAILED DESCRIPTION OF THE INVENTION

The present subject matter provides simple but robust error detection and recovery techniques for channel errors, encountered during transmission, found at a decoder end while decoding compressed video signals. These techniques are especially suitable for use in MPEG-4 coded video frames. In one example embodiment, this is accomplished by analyzing boundaries between current, preceding, and subsequent video packets to detect and correct for any channel errors found in the received coded video signal by limiting the found channel errors to a substantially few macroblocks in the coded video signal.

In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

The terms "coder", "encoder", and "video coder" are used interchangeably throughout the document. Also, the terms "frame", "video frame", and "coded frame" are used interchangeably throughout the document. In addition, the terms "error" and "channel error" are used interchangeably throughout the document.

Figure 1:
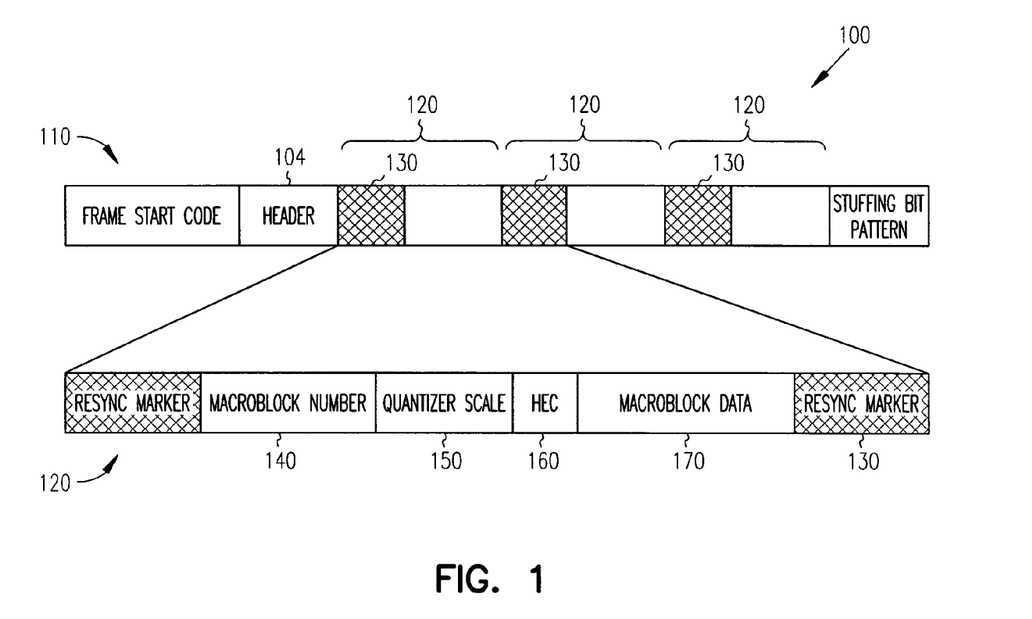
FIG. 1 is a block diagram illustrating an MPEG-4 error resilient video frame including one or more video packets.

FIG. 1 is a block diagram 100 illustrating an MPEG-4 error resilient video frame 110 including one or more video packets 120. An encoded video signal is generally transmitted as a sequence of such video frames. The MPEG-4 coded video frame 110 shown in FIG. 1 is generally divided into 8×8 or 16×16 macroblocks. As described earlier, an MPEG-4 coded video frame may be either intra-coded or inter-coded. As shown in FIG. 1, a typical MPEG-4 coded video frame 110 contains a frame start code 102, a header 104, a sequence of one or more video packets 120, and a stuffing bit pattern 106 following the one or more video packets 120. In addition, MPEG-4 provides error isolation toolsets in video frames, such as multiple video packets, reversible variable length codes (RVLC), the header extension codes (HEC) to isolate errors to code the video signal in the video packets 120. However, using such error isolation toolsets is optional and not mandatory to get a complaint video stream. If used, these toolsets can improve error resilience of a coded video bit stream and hence can conceal errors.

Generally, all transform coefficients and the motion vector data are coded using variable length codes. An error in one of the codes can give rise to an error in the decoding of coefficients occurring later in the stream. Therefore, very efficient error localization is required to confine the error to just a few macroblocks. An MPEG-4 error resilience toolset contains certain inbuilt features, such as the frame start code 102, the header 104, and resync markers 130, which enable error recovery. In order to confine error, each video frame 110 is divided into one or more video packets 120 including groups of macroblocks from the video frame 110 as described-above.

As shown in FIG. 1, each MPEG-4 error resilient video packet 100 includes an error resilient tool, such as the resync marker 130 at the end of each video packet 120. Each current video packet 120 is independent of the preceding video packets 120 of a video frame 110, i.e., the macroblocks in the current video packet 120 do not use any of the parameters that have been sent as part of the preceding video packets 120 in the video frame 110. Therefore, any error in the current video packet 120 is confined to just the current video packet 120 and not the preceding video packets 120. In addition to resync marker 130, each video packet 120 also includes a macroblock number 140 following the resync marker 130, a quantizer scale 150 following the macroblock number 140, a header extension code (HEC) 160 following the quantizer scale 150, and macroblock data 170 following the HEC 160. The HEC is optionally sent and it contains some header information like modulo time base, vop time increment, and fcode and so on. The macroblock number 140 indicates the macroblock number of the first macroblock in a video packet 120. The macroblock count starts from zero on top left edge of the video frame in a raster scan order.

Figure 2:
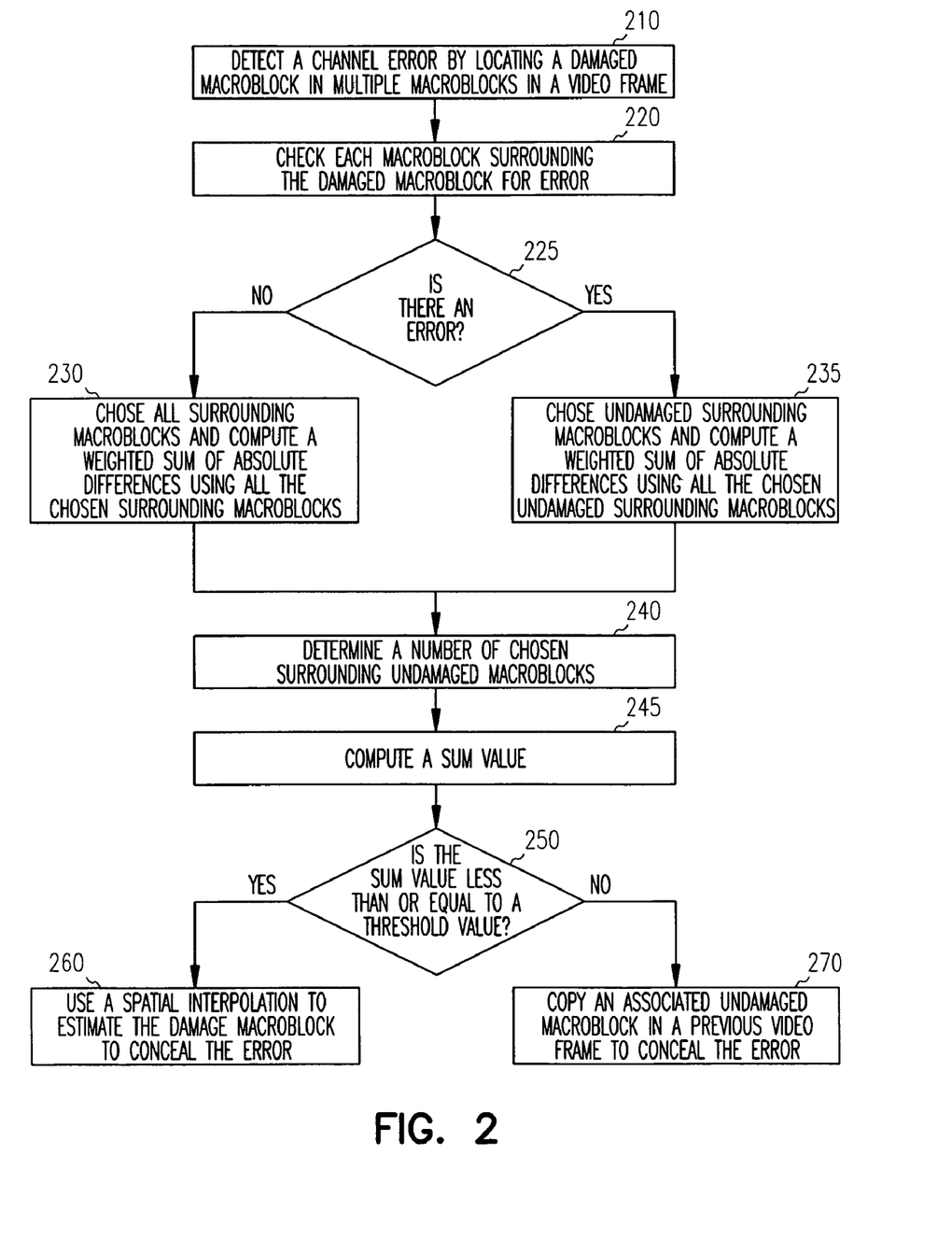
FIG. 2 is a flowchart illustrating an example error concealment technique.

FIG. 2 is a flowchart illustrating an example error concealment method 200 that uses texture data in a video frame to conceal channel errors found in the video frame. At 210, the method 200 in this example embodiment detects a channel error by locating a damaged macroblock in multiple macroblocks in the video frame using header and global information. In some embodiments, a coded video signal is parsed to obtain a sequence of video frames. Each video frame is then further parsed to obtain macroblock data including multiple macroblocks, the header and global information, and video packet information. Detection of channel errors is explained in more detail with reference to FIG. 5.

The following acts 220-270 describe estimation of the damaged macroblock by using undamaged macroblocks surrounding a boundary of the damaged macroblock in the video frame. In some embodiments, the damaged macroblock is estimated by using a weighted linear interpolation of the undamaged macroblocks surrounding the damaged macroblock. In these embodiments, the damaged macroblock is estimated by computing a pixel value for each pixel in the damaged macroblock as a function of associated pixels in the undamaged macroblocks surrounding the damaged macroblock. Also in these embodiments, the computed weighted of each associated pixel is inversely proportional to the distance between a pixel being estimated and a pixel being used for estimation.

Figure 3:
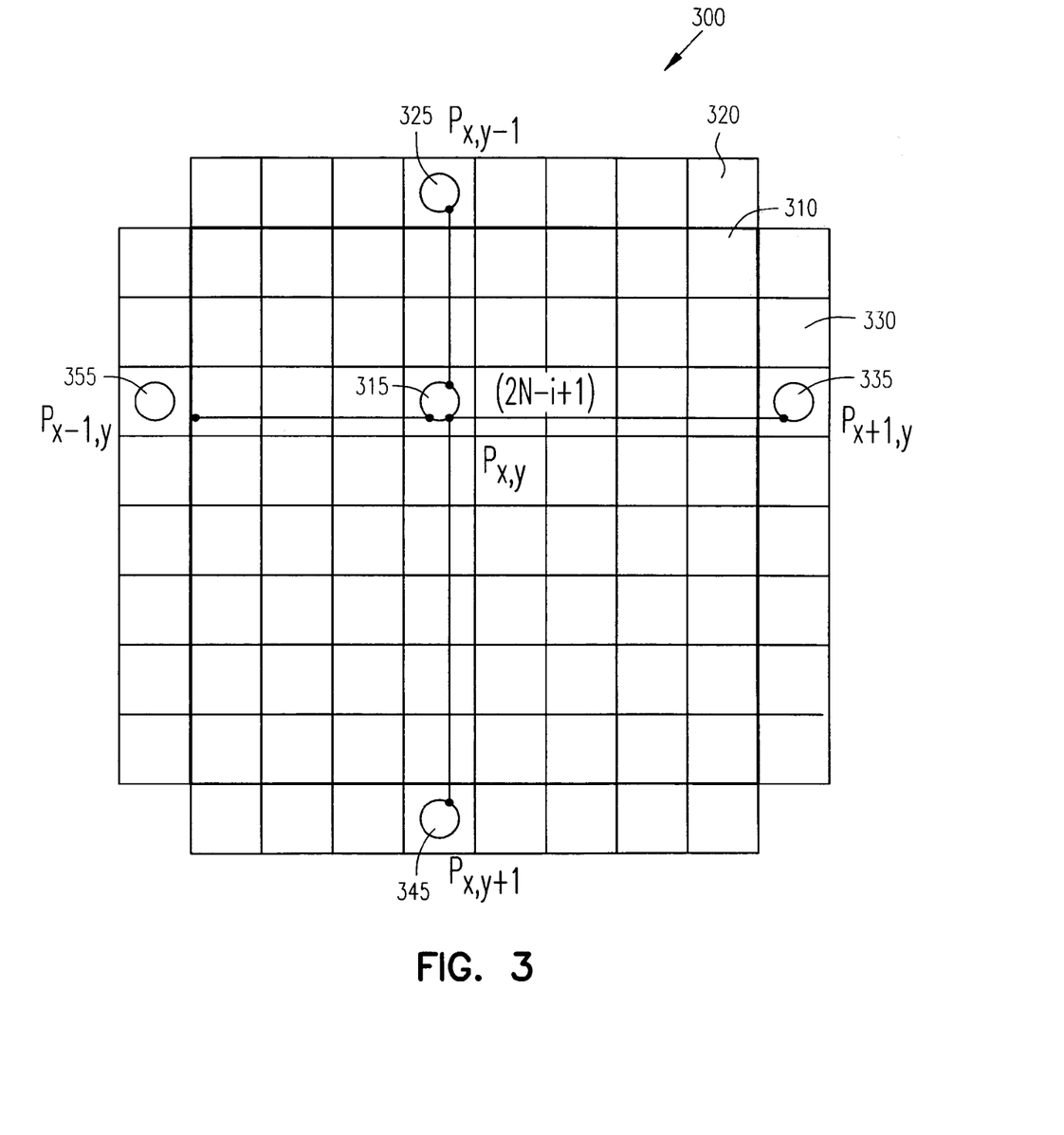
FIG. 3 is a block diagram illustrating the implementation of the error concealment technique of FIG. 2.

FIG. 3 is a block diagram illustrating the implementation of the error concealment technique of FIG. 2. FIG. 3 shows a current video frame 310 including a macroblock 315 having a damaged pixel $P_{x,y}$. Also shown partially, in FIG. 3, are macroblocks 320, 330, 340, and 350 of video frames surrounding the boundary of the damaged macroblock 310. It can be seen in FIG. 3 that the damaged pixel $P_{x,y}$ is concealed by estimating a weighted sum of the associated pixels $P_{x,y-1}$, $P_{x+1,y}$, $P_{x,y+1}$, and $P_{x-1,y}$ disposed in the macroblocks 320, 330, 340, and 350 of the video frames, respectively. It can also be seen in FIG. 3 that the weights used are inversely proportional to the distance between the pixel being estimated and pixel being used for estimation. This technique provides a good scheme to conceal the error when the macroblock being concealed is similar to the surrounding macroblocks. If the surrounding macroblocks are not similar to the damaged macroblock, then this technique can lead to artifacts.

At 220 and 225, each macroblock surrounding the damaged macroblock is checked for error. If there is an error, then the undamaged surrounding macroblocks are chosen and a weighted sum of absolute differences between pixel values in the chosen undamaged macroblocks surrounding the damaged macroblock in the current frame and associated pixel values in associated macroblocks in a previous video frame is computed at 235. If there is no error, then all the macroblocks surrounding the damaged macroblock are chosen and a weighted sum of absolute differences between the pixel values in the chosen macroblocks surrounding the damaged macroblock and associated macroblocks in the previous video frame is computed at 230.

At 240, a number of chosen surrounding undamaged macroblocks used in computing the weighted sum of absolute differences is determined. In some embodiments the number of chosen undamaged macroblocks are in the range of about 1-4 undamaged macroblocks. At 245, a sum value is computed by dividing the computed weighted sum of the absolute differences by the number of chosen undamaged macroblocks.

At 250, the computed sum value is compared to a threshold value. If the computed sum value is less than or equal to the threshold value, then a spatial interpolation is used to estimate the damaged macroblock to conceal the error at 260. If the computed sum value is greater than the threshold value, then an associated undamaged macroblock in a previous video frame is copied to conceal the error at 270.

Figure 4:
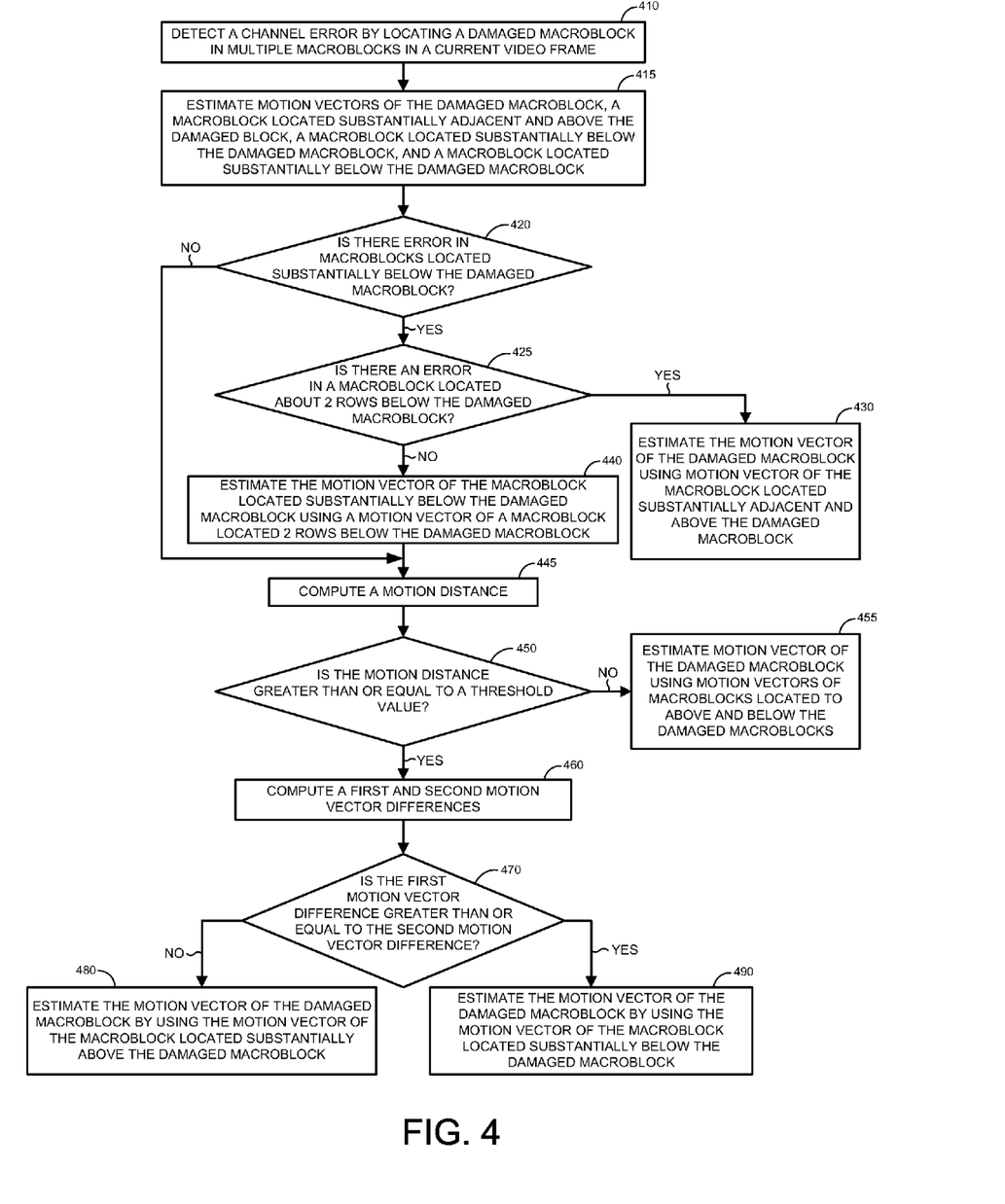
FIG. 4 is a flowchart illustrating another example error recovery technique.

Referring now to FIG. 4, there is illustrated a flowchart of another example error concealment method 400 according to the present subject matter. The method 400 shows a technique to conceal the error in a damaged macroblock of a video frame. At 410, the method 400 in this example embodiment detects a channel error by locating a damaged macroblock in multiple macroblocks in a current video frame using header information, global information, and/or video packet information in the video frame.

The following acts 415-490, shown in FIG. 4, describe reconstruction of the detected damaged macroblock by estimating a motion vector of the damaged macroblock using motion vectors of undamaged macroblocks surrounding the damaged macroblock. In some embodiments, the damaged macroblock is reconstructed using the motion vectors of the undamaged macroblocks located in rows that are substantially adjacent to the damaged macroblock. In some embodiments, the damaged macroblock is reconstructed using the motion vectors of the undamaged macroblocks located in about two rows that are substantially adjacent to the damaged macroblock.

At 415, the motion vectors of the damaged macroblock, a macroblock located substantially adjacent and above the damaged macroblock, a macroblock located substantially below the damaged macroblock, a macroblock located substantially adjacent, above, and/or left of the damaged macroblock are estimated. At 420, the motion vector of the macroblock located substantially below the damaged macroblock is checked for error. At 425, the macroblock located about 2 rows substantially below the damaged macroblock is checked for error.

If there is an error in the macroblocks located substantially below the damaged macroblock and also the macroblock located about 2 rows substantially below the damaged macroblock, then the motion vector of the damaged macroblock is estimated as the motion vector of the macroblock located substantially adjacent and above the damaged macroblock at 440. If there is no error in the macroblock located about 2 rows substantially below the damaged macroblock, then estimating the motion vector of the macroblock located substantially below the damaged macroblock by assigning a motion vector of a macroblock located in about 2 rows below the damaged macroblock at 440.

At 445, a motion distance is computed by computing a sum of absolute difference between the motion vectors of the macroblock located substantially adjacent and above the damaged macroblock and the macroblock located substantially below the damaged macroblock. At 450, the computed motion distance is compared to a motion threshold value.

If the motion distance is less the motion threshold value, then the motion vector of the damaged macroblock is estimated using the equation at 455:

motion vector of the damaged macroblock=($\alpha$*motion vector of the macroblock located substantially adjacent and above the damaged macroblock+$(1-\alpha)$*motion vector of the macroblock located substantially below the damaged macroblock).

If the motion distance is greater than or equal to the motion threshold value, then a first motion vector difference is computed by computing a sum of absolute difference between the motion vectors of the macroblock located substantially adjacent, above, and left of the damaged macroblock and the macroblock located substantially adjacent and above the damaged macroblock at 460. Also at 460, a second motion vector difference is computed by computing a sum of absolute difference between the motion vectors of the macroblock located substantially adjacent, above, and left of the damaged macroblock and the macroblock located substantially below the damaged macroblock. At 470, the computed first and second motion vector differences are compared. In the case of the damaged macroblock being the first macroblock in a row, a macroblock located substantially above and to the right of the damaged macroblock is assigned to the motion vector of the macroblock substantially above and to the left of the damaged macroblock and is used for computing the motion vector difference.

If the first motion difference is less than or equal to the second motion vector difference then the motion vector of the damaged macroblock is estimated using the motion vector of the macroblock located substantially adjacent and above the damaged macroblock at 490. If the first motion difference is greater than the second motion vector difference, then the motion vector of the damaged macroblock is estimated using the motion vector of the macroblock located substantially below the damaged macroblock at 480 to conceal the error in the damaged macroblock.

Although the above methods 200 and 400 include acts that are arranged serially in the exemplary embodiments, other embodiments of the present subject matter may execute two or more acts in parallel, using multiple processors or a single processor organized two or more virtual machines or sub-processors. Moreover, still other embodiments may implement the acts as two or more specific interconnected hardware modules with related control and data signals communicated between and through the modules, or as portions of an application-specific integrated circuit. Thus, the above exemplary process flow diagrams are applicable to software, firmware, and/or hardware implementations.

Figure 5:
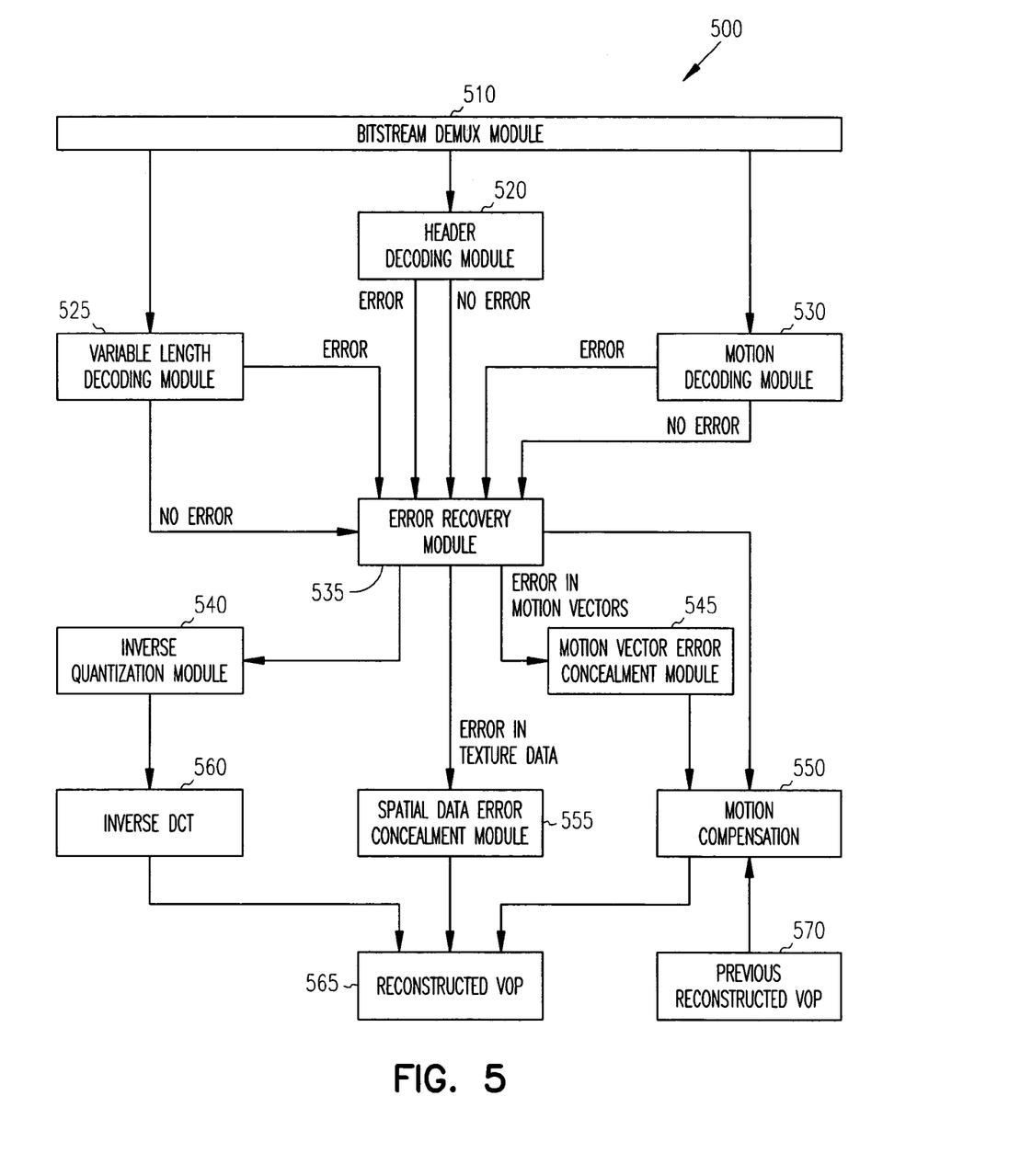
FIG. 5 is a block diagram illustrating an example decoder including an error recovery module for implementing embodiments of the present invention, such as those shown in FIGS. 2-4.

Referring now to FIG. 5, there is illustrated an example embodiment of a decoder 500 according to the present subject matter. The decoder includes a bit stream demux module 510, a header decoding module 520, a variable length decoding module 525, a motion decoding module 530, an error recovery module 535, an inverse quantization module 540, a motion vector error concealment module 545, a motion compensation module 550, a spatial data error concealment module 555, an inverse DCT module 560, a reconstructed VOP module 565, and a previous reconstructed VOP module 570.

In operation, in one example embodiment, the bit stream demux module 510 receives encoded video signal in the form of a sequence of coded MPEG-4 video frames. Each video frame includes a frame start code, one or more video packets following the start code, header and global information, and a stuffing bit pattern following the one or more video packets. Each video packet comprises a resync marker data, a macroblock number, motion and header information, and one or more macroblocks. The bit stream demux module 510 parses the received video signal to obtain the one or more coded video frames. The header decoding module 520 parses each video frame to get the header and global information, the resync marker data, and the stuffing bit pattern. In one embodiment, the error recovery module 535 detects and recovers from an error by localizing the error to a few macroblocks in the coded video frame based on analyzing the obtained header and global information.

In another embodiment, the error recovery module 535 analyzes boundaries of current, preceding, and subsequent video packets for a number of macroblocks present in gaps and/or overlaps between the current, preceding, and subsequent video packets. The error recovery module 535 then detects error location based on the outcome of the analysis of the boundaries of the current, preceding, and subsequent video packets. The error recovery module 535, then recovers from the error by limiting propagation of the error substantially to the error location by using the detected error location.

In some embodiments, the error recovery module 535 analyzes the boundaries of the current and preceding video packets and computes a first number of macroblocks in a gap or an overlap existing between the boundaries of the current and preceding video packets to detect the error and to isolate the propagation of the error to substantially few macroblocks in a video packet. The error recovery module 535 further computes a second number of macroblocks in a gap or an overlap existing between the boundaries the current and subsequent video packets. The error recovery module 535 then compares the computed first and second number of macroblocks. The error recovery module 535 then corrects the current video packet, if the first number of macroblocks is equal to the second number of macroblocks to localize the found error to a few macroblocks to the current video packet. The error recovery module 535 corrects the previous video packet, if the first number of macroblocks is not equal to the second number of macroblocks to localize the found error to a few macroblocks in the previous video packet.

In another embodiment, the error recovery module 535 analyzes the resync marker lengths of the header and first and second video packets of a video frame to detect the error and to limit the error propagation substantially to the error location. In these embodiments, the error recovery module 535 obtains the resync marker lengths of the header and first and second video packets of a video frame. The error recovery module 535 checks for error in resync marker, if the resync marker length of the first video packet is not equal to the resync marker length obtained from the header. The error recover module further obtains a resync marker length of a second video packet in the video frame. The error recovery module 535 then corrects the header resync marker length using the resync marker length of the first video packet and decodes the video frame using the corrected resync marker length found in the header, if the resync marker length of the second video packet is equal to the resync marker length of the first video packet and if the resync marker length has the error. The error recovery module 535 decodes the video frame using the resync marker length found in the header when the resync marker length of the second video packet is not equal to the resync marker length of the first video packet and if the resync marker length does not have the error.

In yet another embodiment, the error recovery module analyzes a frame start code to detect the error and to limit the error propagation substantially to the error location. The frame start code includes first, second, third, and fourth bytes. In one embodiment, the byte pattern in the first byte starts with a byte pattern "00" and ends with a byte pattern "XX". In these embodiments, the error recovery module 535 resets a counter value to zero. The error recovery module 535 increments the counter value by a predetermined number, if the byte pattern in the second byte is not equal to "00". The error recovery module 535 further increments the counter value with the predetermined number, if the byte pattern in the second byte is not equal to "00". The error recovery module 535 further increments the counter value with the predetermined number, if the third byte pattern is not equal to "01". The error recovery module 535 further increments the counter value with the predetermined number, if the fourth byte pattern is not equal to a predetermined frame start code pattern, such as an "XXXX XXXX" pattern. The error recovery module 535 then corrects the frame start code when the counter value is greater than or equal to a threshold value.

In yet another embodiment, the error recovery module analyzes stuffing bit pattern in a current video frame to detect the error and to substantially limit the error propagation to the error location. In one embodiment, the error recovery module 535 compares the stuffing bit pattern in the current video frame to a predetermined number of standard stuffing bit patterns. The error recovery module 535 then counts a number of bit mismatches in the stuffing bit pattern in the current video frame, if the stuffing bit pattern in the current video frame is not equal to any one of the predetermined number of standard stuffing bit patterns. The error recovery module 535 further compares the bit pattern in the bits in the predetermined range prior to a byte aligned position to the predetermined number of standard stuffing bit patterns. The error recovery module 535 then corrects the stuffing bit pattern in the current video frame, if the bit pattern in the bits in the predetermined range prior to the byte aligned position is not equal to any one of the predetermined number of standard stuffing bit patterns. The error recovery module 535 moves a second predetermined number of bit mismatches and then searches for a frame start code from this new position, if the number of bit mismatches in the stuffing bit pattern in the current video frame is not less than a predetermined number. The error recovery module 535 then corrects the video packet, if the frame start code is found in the new position.

In some embodiments, the error recovery module 535 detects a channel error by locating a damaged macroblock in the multiple macroblocks using one of the above described techniques. The spatial data error concealment module 555 estimates the damaged macroblock by using undamaged macroblocks substantially surrounding the boundary of the damaged macroblock and replaces the damaged macroblock with the estimated damaged macroblock to conceal the channel error in the damaged macroblock to improve video quality. In these embodiments, the spatial data error concealment module 555 estimates the damaged macroblock by computing a weighted linear interpolation of the undamaged macroblocks surrounding the damaged macroblock. The spatial data error concealment module 555 computes a weighted linear interpolation of the damaged macroblock by computing a pixel value for each pixel in the damaged macroblock as a function of associated pixels in the undamaged macroblocks surrounding the boundary of the damaged macroblock.

In an another embodiment, the spatial data error concealment module 555 estimates a pixel value for each pixel in the damaged macroblock by computing a weighted sum of associated pixel values in each of the undamaged macroblocks surrounding the damaged macroblock. The spatial data error concealment module 555 then copies the estimated damaged macroblock to conceal the error in the damaged macroblock. In these embodiments, the computed weight of each associated pixel is inversely proportional to the distance between an estimated pixel and a pixel being used for estimation.

In yet another embodiment, the motion vector error concealment module 545 estimates a motion vector of the damaged macroblock by using motion vectors of undamaged macroblocks surrounding the damaged macroblock. The motion vector error concealment module 545 then reconstructs the damaged macroblock using the estimated damaged macroblock to conceal the error in the damaged macroblock. In some embodiments, the motion vector error concealment module 545 estimates the motion vector of the damaged macroblock using the motion vectors of the undamaged macroblocks located in about two rows that are substantially adjacent to the damaged macroblock.

Various embodiments of the present invention can be implemented in software, which may be run in the environment shown in FIG. 6 (to be described below) or in any other suitable computing environment. The embodiments of the present invention are operable in a number of general-purpose or special-purpose computing environments. Some computing environments include personal computers, general-purpose computers, server computers, hand-held devices (including, but not limited to, telephones and personal digital assistants of all types), laptop devices, multi-processors, microprocessors, set-top boxes, programmable consumer electronics, network computers, minicomputers, mainframe computers, distributed computing environments and the like to execute code stored on a computer-readable medium. The embodiments of the present invention may be implemented in part or in whole as machine-executable instructions, such as program modules that are executed by a computer. Generally, program modules include routines, programs, objects, components, data structures, and the like to perform particular tasks or to implement particular abstract data types. In a distributed computing environment, program modules may be located in local or remote storage devices.

Figure 6:
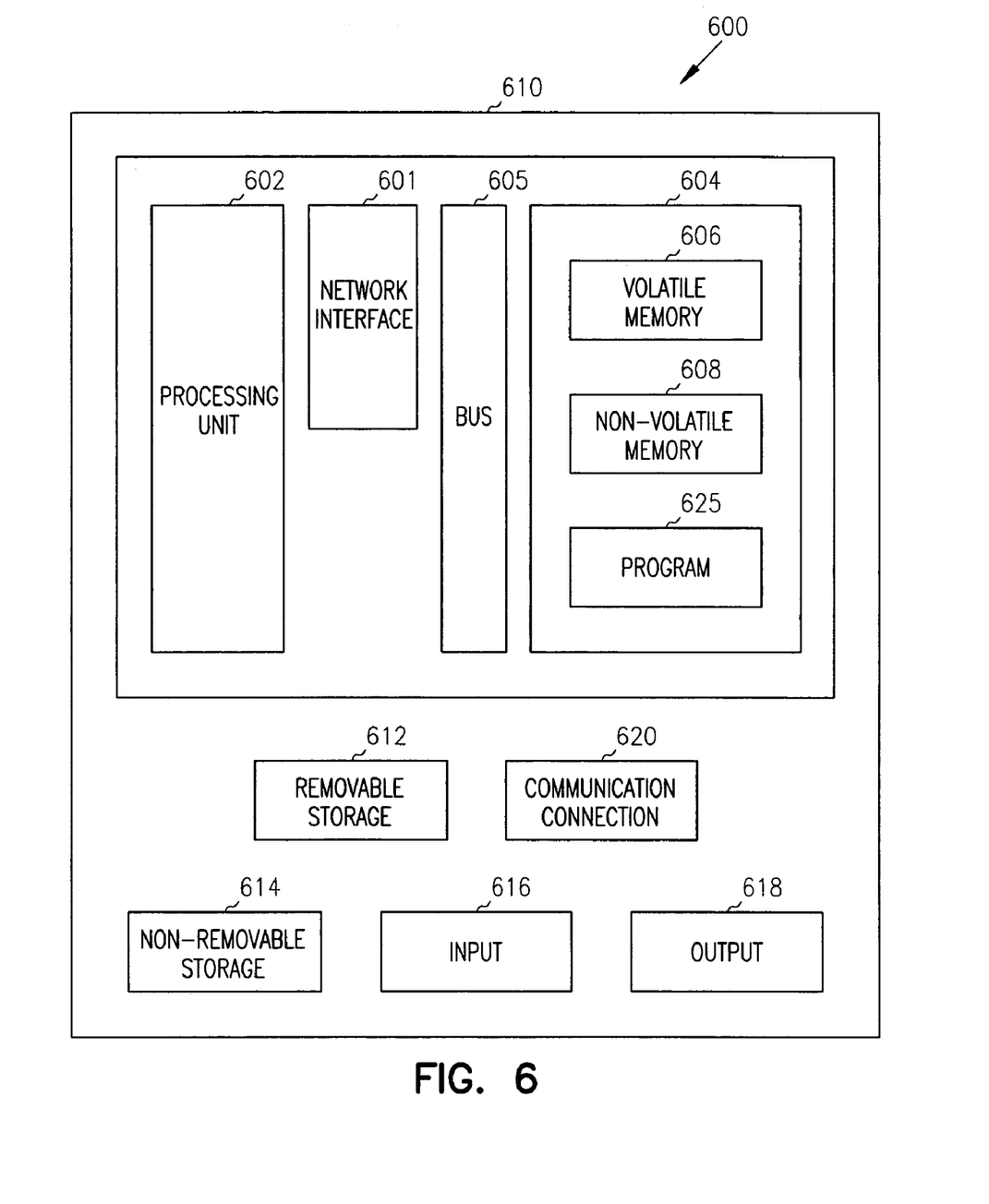
FIG. 6 is an example of a suitable computing environment for implementing embodiments of the present invention.

FIG. 6 shows an example of a suitable computing system environment for implementing embodiments of the present invention. FIG. 6 and the following discussion are intended to provide a brief, general description of a suitable computing environment in which certain embodiments of the inventive concepts contained herein may be implemented.

A general computing device, in the form of a computer 610, may include a processing unit 602, memory 604, removable storage 612, and non-removable storage 614. Computer 610 additionally includes a bus 605 and a network interface (NI) 601.

Computer 610 may include or have access to a computing environment that includes one or more input elements 616, one or more output elements 618, and one or more communication connections 620 such as a network interface card or a USB connection. The computer 610 may operate in a networked environment using the communication connection 620 to connect to one or more remote computers. A remote computer may include a personal computer, server, router, network PC, a peer device or other network node, and/or the like. The communication connection may include a Local Area Network (LAN), a Wide Area Network (WAN), and/or other networks.

The memory 604 may include volatile memory 606 and non-volatile memory 608. A variety of computer-readable media may be stored in and accessed from the memory elements of computer 610, such as volatile memory 606 and non-volatile memory 608, removable storage 612 and non-removable storage 614.

Computer memory elements can include any suitable memory device(s) for storing data and machine-readable instructions, such as read only memory (ROM), random access memory (RAM), erasable programmable read only memory (EPROM), electrically erasable programmable read only memory (EEPROM), hard drive, removable media drive for handling compact disks (CDs), digital video disks (DVDs), diskettes, magnetic tape cartridges, memory cards, Memory Sticks™, and the like; chemical storage; biological storage; and other types of data storage.

"Processor" or "processing unit," as used herein, means any type of computational circuit, such as, but not limited to, a microprocessor, a microcontroller, a complex instruction set computing (CISC) microprocessor, a reduced instruction set computing (RISC) microprocessor, a very long instruction word (VLIW) microprocessor, explicitly parallel instruction computing (EPIC) microprocessor, a graphics processor, a digital signal processor, or any other type of processor or processing circuit. The term also includes embedded controllers, such as generic or programmable logic devices or arrays, application specific integrated circuits, single-chip computers, smart cards, and the like.

Embodiments of the present invention may be implemented in conjunction with program modules, including functions, procedures, data structures, application programs, etc., for performing tasks, or defining abstract data types or low-level hardware contexts.

Machine-readable instructions stored on any of the above-mentioned storage media are executable by the processing unit 602 of the computer 610. For example, a computer program 625 may comprise machine-readable instructions capable of detecting and correcting the channel errors in transmitted encoded video signals according to the teachings and herein described embodiments of the present invention. In one embodiment, the computer program 625 may be included on a CD-ROM and loaded from the CD-ROM to a hard drive in non-volatile memory 608. The machine-readable instructions cause the computer 610 to detect and correct channel errors in a video frame according to the embodiments of the present invention.

The above description is intended to be illustrative, and not restrictive. Many other embodiments will be apparent to those skilled in the art. The scope of the invention should therefore be determined by the appended claims, along with the full scope of equivalents to which such claims are entitled.

The invention claimed is:

1. A method comprising:
    detecting a channel error by locating a damaged macroblock ($P_{x,y}$) in multiple macroblocks of a video frame using header information by a video decoder; and
    isolating the detected channel error to a few macroblocks around the located damaged macroblock to reduce data loss and improve video quality, wherein isolating the detected channel error comprises:
    estimating the damaged macroblock by using undamaged macroblocks substantially surrounding a boundary of the damaged macroblock in the video frame by the video decoder, wherein the undamaged macroblocks include 1 to 4 undamaged macroblocks ($P_{x,y-1}$, $P_{x+1,y}$, $P_{x,y+1}$, and $P_{x-1,y}$) and wherein estimating the damaged macroblock includes estimating the damaged macroblock by using a weighted linear interpolation of the undamaged macroblocks surrounding the damaged macroblock; and
    replacing the damaged macroblock with the estimated damaged macroblock to conceal the error in the damaged macroblock by the video decoder.

2. The method of claim 1, further comprising:
    receiving a coded video signal;
    parsing the coded video signal to obtain a sequence of video frames; and
    parsing each video frame to obtain the header information, video packet information, and macroblock data, wherein the macroblock data includes multiple macroblocks.

3. The method of claim 1, wherein estimating the damaged macroblock using the undamaged macroblocks comprises:

computing a pixel value for each pixel in the damaged macroblock as a function of associated pixels in the undamaged macroblocks substantially surrounding the boundary of the damaged macroblock.

4. A method comprising:
detecting an error by locating a damaged macroblock ($P_{x,y}$) in multiple macroblocks in a video frame using header information, global information, and/or video packet information in the video frame by a video decoder;
estimating a pixel value for each pixel in the damaged macroblock by computing a weighted sum of the associated pixel values in each of the undamaged macroblocks surrounding the damaged macroblock by the video decoder, wherein, in estimating, the undamaged macroblocks surrounding the damaged macroblock include about 1 to 4 undamaged macroblocks ($P_{x,y-1}$, $P_{x+1,y}$, $P_{x,y+1}$, and $P_{x-1,y}$); and
copying the estimated pixel value of each pixel in the damaged macroblock to conceal the error in the damaged macroblock by the video decoder.

5. The method of claim 4, wherein, in computing, the computed weight of each associated pixel is inversely proportional to the distance between a pixel being estimated and a pixel being used for estimation.

6. A method comprising:
detecting an error by locating a damaged macroblock in multiple macroblocks in a video frame using header information, global information, and/or video packet information in the video frame by a video decoder;
estimating a pixel value for each pixel in the damaged macroblock by computing a weighted sum of the associated pixel values in each of the undamaged macroblocks surrounding the damaged macroblock by the video decoder; and
copying the estimated damaged macroblock to conceal the error in the damaged macroblock by the video decoder,
wherein estimating the pixel value of each pixel in the damaged macroblock by computing a weighted sum of the associated pixels in each of the undamaged macroblocks surrounding the damaged macroblock comprises:
checking each of the macroblocks surrounding the damaged macroblock for an error in the current video frame;
if there is an error, then choosing undamaged macroblocks based on the detected error and computing a weighted sum of absolute differences between pixel values in the chosen undamaged macroblocks surrounding the damaged macroblock in the current frame and associated pixel values in associated macroblocks in a previous video frame;
if there is no error, then choosing all macroblocks surrounding the damaged macroblock as the undamaged macroblocks and computing a weighted sum of absolute differences between pixel values in the chosen macroblocks surrounding the damaged macroblock and associated macroblocks in the previous video frame;
determining a number of chosen undamaged macroblocks used in computing the weighted sum of absolute differences;
computing a sum value by dividing the computed weighted sum of the absolute differences by the number of chosen undamaged macroblocks;
comparing the computed sum value with a threshold value;
if the computed sum value is less than or equal to the threshold value, then using a spatial interpolation to estimate the damaged macroblock to conceal the error; and
if the computed sum value is greater than the threshold value, then copying an associated undamaged macroblock in a previous video frame to conceal the error.

7. The method of claim 4, wherein the header information includes information selected from the group consisting of a frame start code, header information, and a stuffing bit pattern.

8. The method of claim 4, wherein the video packet information includes information selected from the group consisting of resync marker data, a macroblock number, and motion and header information.

9. A method comprising:
detecting a channel error by locating a damaged macroblock in multiple macroblocks in a current video frame using header information, global information, and/or video packet information in the video frame by a video decoder;
reconstructing the damaged macroblock by estimating a motion vector of the damaged macroblock using motion vectors of undamaged macroblocks surrounding the damaged macroblock by the video decoder, wherein reconstruction of the damaged macroblock by estimating the motion vector of the damaged macroblock using the motion vectors of the undamaged macroblocks surrounding the damaged macroblock comprises:
estimating the motion vector of the damaged macroblock in the current video frame;
estimating a motion vector of a macroblock located substantially adjacent and above the damaged macroblock;
estimating a motion vector of a macroblock located substantially below the damaged macroblock;
estimating a motion vector of a macroblock located substantially adjacent, above, and left of the damaged macroblock;
checking for error in the macroblock located substantially below the damaged macroblock; and
if there is an error in the macroblock located substantially below the damaged macroblock, then estimating the motion vector of the macroblock located substantially below the damaged macroblock by assigning a motion vector of a macroblock located about 2 rows below the damaged macroblock; and
copying the reconstructed damaged macroblock to conceal the error in the damaged macroblock by the video decoder.

10. The method of claim 9, wherein using the motion vectors of the undamaged macroblocks surrounding the damaged macroblock comprises:
using the motion vectors of undamaged macroblocks located in two rows that are substantially adjacent to the damaged macroblock.

11. A method comprising:
detecting a channel error by locating a damaged macroblock in multiple macroblocks in a current video frame using header information, global information, and/or video packet information in the video frame by a video decoder;
reconstructing the damaged macroblock by estimating a motion vector of the damaged macroblock using motion vectors of undamaged macroblocks surrounding the damaged macroblock by the video decoder, wherein reconstruction of the damaged macroblock by estimating the motion vector of the damaged macroblock using the motion vectors of the undamaged macroblocks surrounding the damaged macroblock comprises:
estimating the motion vector of the damaged macroblock in the current video frame;
estimating a motion vector of a macroblock located substantially adjacent and above the damaged macroblock;
estimating a motion vector of a macroblock located substantially below the damaged macroblock;
estimating a motion vector of a macroblock located substantially adjacent, above, and left of the damaged macroblock;
checking for error in the macroblock located substantially below the damaged macroblock;
if there is an error in the macroblock located substantially below the damaged macroblock, then estimating the motion vector of the damaged macroblock as the motion vector of the macroblock located substantially adjacent and above the damaged macroblock;
if there is error in the associated macroblock located substantially below the damaged macroblock, then estimating the motion vector of the macroblock located substantially below the damaged macroblock by assigning a motion vector of a macroblock located about 2 rows below the damaged macroblock, and then computing a motion distance by computing a sum of absolute difference between the motion vectors of the macroblock located substantially adjacent and above the damaged macroblock and the macroblock located substantially below the damaged macroblock;
if the computed motion distance is less than a motion threshold value, then estimating the motion of the damaged macroblock using the equation:
motion vector of the damaged macroblock=(($\alpha$)*motion vector of the macroblock located substantially adjacent and above the damaged macroblock+(1-$\alpha$)*motion vector of the macroblock located substantially below the damaged macroblock);
if the computed motion distance is greater than or equal to the motion threshold value, then computing a first motion vector difference by computing a sum of absolute difference between the motion vectors of the macroblock located substantially adjacent, above, and left of the damaged macroblock and the macroblock located substantially adjacent and above the damaged macroblock, and further computing a second motion vector difference by computing a sum of absolute difference between the motion vectors of the macroblock located substantially adjacent, above, and left of the damaged macroblock and the macroblock located substantially below the damaged macroblock;
if the first motion vector difference is less than or equal to the second motion vector difference, then estimating the motion vector of the damaged macroblock as the motion vector of the macroblock located substantially adjacent and above the damaged macroblock; and
if the first motion vector difference is greater than the second motion vector difference, then estimating the motion vector of the damaged macroblock as the motion vector of the macroblock located substantially below the damaged macroblock; and
copying the reconstructed damaged macroblock to conceal the error in the damaged macroblock by the video decoder.

12. The method of claim 9, wherein, in estimating, the macroblock located substantially below the damaged macroblock comprises a macroblock located about two rows below the damaged macroblock.

13. An apparatus comprising:
a header decoding module parses a video frame to get header information and multiple macroblocks;
an error recovery module detects a channel error by locating a damaged macroblock ($P_{x,\,y}$) in the multiple macroblocks using the header information; and
a spatial data error concealment module estimates the damaged macroblock by using undamaged macroblocks substantially surrounding a boundary of the damaged macroblock and replaces the damaged macroblock with the estimated damaged macroblock to conceal the channel error in the damaged macroblock, wherein the undamaged macroblocks include 1 to 4 undamaged macroblocks ($P_{x,\,y-1}$, $P_{x+1,\,y}$, $P_{x,\,y+1}$, and $P_{x-1,\,y}$), and wherein the spatial data error concealment module estimates the damaged macroblock by using a weighted linear interpolation of the undamaged macroblocks surrounding the damaged macroblock.

14. The apparatus of claim 13, further comprising: a bit stream demux module receives a coded video signal and obtains a sequence of video frames.

15. The apparatus of claim 13, wherein the spatial data error concealment module estimates the damaged macroblock by computing a pixel value for each pixel in the damaged macroblock as a function of associated pixels in the undamaged macroblocks surrounding the damaged macroblock.

16. A video decoder comprising:
a header decoding module to parse a video frame to get header information, video packet information, and multiple macroblocks;
an error recovery module to detect an error in a damaged macroblock ($P_{x,\,y}$) in the multiple macroblocks of the video frame using the header information and/or the video packet information; and
a spatial data error concealment module to estimate a pixel value for each pixel in the damaged macroblock by computing a weighted sum of associated pixel values in each of undamaged macroblocks surrounding the damaged macroblock, wherein the spatial data error concealment module to copy the estimated pixel value of each pixel in the damaged macroblock to conceal the error in the damaged macroblock, wherein the undamaged macroblocks surrounding the damaged macroblock include about 1 to 4 undamaged macroblocks ($P_{x,\,y-1}$, $P_{x+1,\,y}$, $P_{x,\,y+1}$, and/or $P_{x-1,\,y}$) substantially surrounding the damaged macroblock.

17. The video decoder of claim 16, wherein the computed weight of each associated pixel is inversely proportional to the distance between an estimated pixel and a pixel being used for estimation.

18. An apparatus for decoding a coded video signal comprising:
a header decoding module parses a video frame to get header information and multiple macroblocks;
an error recovery module detects a channel error by locating a damaged macroblock in the multiple macroblocks using the header information, global information, and/or video packet information in the video frame;
a spatial data error concealment module obtains motion vectors of undamaged macroblocks surrounding the damaged macroblock, wherein the spatial error concealment module estimates a motion vector of the damaged macroblock using the motion vectors of undamaged macroblocks, wherein the spatial data error concealment module reconstructs the damaged macroblock using the estimated damaged macroblock, wherein the spatial data error concealment module estimates the motion vector of the damaged macroblock using the motion vectors of the undamaged macroblocks located in about two rows that are substantially adjacent and below the damaged macroblock, and wherein reconstruction of the damaged macroblock by estimating the motion vector of the damaged macroblock comprises:

estimating the motion vector of the damaged macroblock in the current video frame;

estimating a motion vector of a macroblock located substantially adjacent and above the damaged macroblock;

estimating a motion vector of a macroblock located substantially below the damaged macroblock; and estimating a motion vector of a macroblock located substantially adjacent, above, and left of the damaged macroblock; and copying the reconstructed damaged macroblock to conceal the error in the damaged macroblock.

19. An article comprising:

a storage medium encoded with a computer program that, when executed by a computing platform, result in execution of a method comprising:

detecting a channel error by locating a damaged macroblock ($P_{x,y}$) in multiple macroblocks of a video frame using header information;

estimating the damaged macroblock by using undamaged macroblocks surrounding the damaged macroblock in the video frame wherein the undamaged macroblocks include 1 to 4 undamaged macroblocks ($P_{x,y-1}$, $P_{x+1,y}$, $P_{x,y+1}$, and $P_{x-1,y}$), and wherein estimating the damaged macroblock includes estimating the damaged macroblock by using a weighted linear interpolation of the undamaged macroblocks surrounding the damaged macroblock; and replacing the damaged macroblock with the estimated damaged macroblock to conceal the error in the damaged macroblock.

20. The article of claim 19, wherein estimating the damaged macroblock using the undamaged macroblocks comprises:

computing a pixel value for each pixel in the damaged macroblock as a function of associated pixels in the undamaged macroblocks surrounding the damaged macroblock.

21. A system comprising:

a bus;

a processor coupled to the bus;

a memory coupled to the processor;

a network interface coupled to the processor and the memory; and a video decoder coupled to the network interface comprising:

a header decoding module parses a video frame to get header information and multiple macroblocks;

an error recovery module coupled to the header decoding module detects a channel error by locating a damaged macroblock ($P_{x,y}$) in the multiple macroblocks using the header information; and a spatial data error concealment module coupled to the error recovery module estimates the damaged macroblock by using undamaged macroblocks surrounding the damaged macroblock and replaces the damaged macroblock with the estimated damaged macroblock to conceal the channel error in the damaged macroblock, wherein the undamaged macroblocks include 1 to 4 undamaged macroblocks ($P_{x,y-1}$, $P_{x+1,y}$, $P_{x,y+1}$, and $P_{x-1,y}$), and wherein the spatial data error concealment module estimates the damaged macroblock by using a weighted linear interpolation of the undamaged macroblocks surrounding the damaged macroblock.

22. The system of claim 21, further comprising:

a bit stream demux module coupled to the header decoding module receives a coded video signal and obtains a sequence of video frames.

* * * * *